March 28, 1950

G. REBER 2,502,343

PULSE GENERATOR

Filed July 26, 1945

2 Sheets-Sheet 1

Inventor
Grote Reber
By Williams, Bradbury & Hinkle
Attorneys

Inventor:
Grote Reber
By Williams, Bradbury & Hinkle
Attorneys

Patented Mar. 28, 1950 2,502,343

UNITED STATES PATENT OFFICE 2,502,343

PULSE GENERATOR

Grote Reber, Wheaton, Ill., assignor to Stewart-Warner Corporation, Chicago, Ill., a corporation of Virginia Application July 26, 1945, Serial No. 607,247

7 Claims. (Cl. 250—36)

The present invention relates to new and improved pulse generators of the electronic type and especially adapted for use with apparatus and systems utilizing a plurality of different frequencies, such, for example, as altimeters.

The primary object of the present invention is the provision of a new and improved pulse generator providing pulse periods of uniform duration in response to different, and even widely different, input or control voltage frequencies.

A further object of the present invention is the provision of a new and improved pulse generator of the character aforesaid requiring no mechanical or electrical switching of components or circuits, whereby the apparatus may be made readily and simply and be both compact and rugged.

Another object of the present invention is the provision of a new and improved pulse generator wherein the input voltages of different frequencies may be selectively connected to the pulse generator without any undue delay.

A further object of the present invention is the provision of a new and improved pulse generator including a damped wave oscillator having a first positive peak which is high relative to the second.

Figure 1:
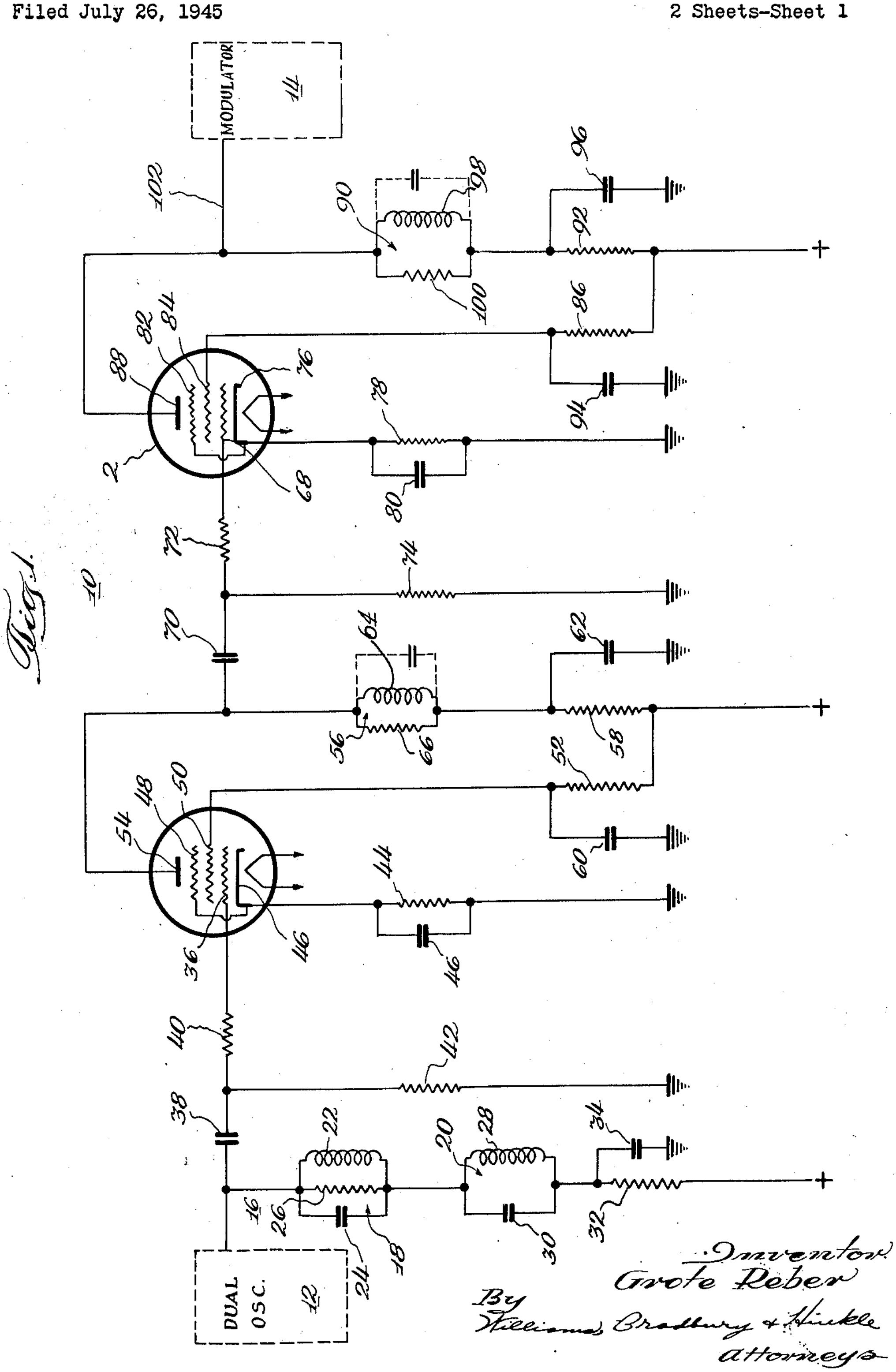

Other objects and advantages of the present invention will become more apparent from the ensuing description, in the course of which reference is had to the accompanying drawings, in which Fig. 1 is a circuit diagram illustrating an embodiment of the invention in which the pulse generator is selectively supplied with control voltages of two different frequencies and Figs. 2 to 6, inclusive, are graphs depicting the wave shapes of the control voltages and output pulses, as well as of the wave shapes at intermediate points in the circuit of Fig. 1.

In the embodiment of the invention illustrated in the drawings, the pulse generator is indicated as a whole by reference character 10. It is constructed and arranged to supply pulses of uniform duration when supplied with two input or control voltages of different frequencies, the pulses recurring at the frequencies of the control voltages. However, it should be understood that the invention is not limited to this number as it may be modified to produce the pulses in response to a greater number of control voltage frequencies, as will appear hereinafter.

The pulse generator includes, in the main, a pair of vacuum tubes 1 and 2 acting as amplifiers and voltage limiters and preferably of the pentode type. The generator is supplied with control voltages of different frequencies from an oscillator 12 and its output is connected to modulator 14. The oscillator, pulse generator and modulator may be used in connection with known types of apparatus such, for example, as an altimeter where uniform pulses of energy at different frequencies are periodically transmitted. The oscillator may be of the crystal controlled type and it may produce control voltages having frequencies of 10 kc. and 100 kc. The high and low frequency voltages are selectively supplied by the oscillator and the time for switching from one to the other is relatively unimportant insofar as the operation of the pulse generator of the present invention is concerned, as will also appear hereinafter.

The output from the dual oscillator 12 is supplied to a compound tuned circuit 16 including resonant circuits 18 and 20 tuned to the high and low frequencies, respectively. The resonant circuit 18 includes an inductance 22 and a capacitor 24 and a loading resistor 26 provided for the purpose of reducing the amplitude of the high frequency voltage, also for a purpose which will appear shortly. The resonant circuit 20 includes an inductance coil 28 and a capacitor 30. Positive anode voltage is supplied, in conventional manner, to the oscillator through the resonant circuits and through a resistor 32 by-passed to ground by a capacitor 34.

The compound tuned circuit is coupled to the control grid 36 of tube 1 through a circuit including the coupling condenser 38, a resistor 40 connecting the capacitor to the grid and a resistor 42 connecting the junction of the capacitor and resistor 40 to ground.

The tube 1 is self-biased by a resistor 44 connected between ground and the cathode 46 of tube 1, the resistor being shunted in usual manner by a capacitor 46. The resistor 44 provides a fixed bias E—44 which is less than the amplitude of the low frequency control voltage applied to the grid 36 and higher than the amplitude of the high frequency voltage applied to the grid 36. As a result the low frequency voltage is limited or clipped off by the tube 1 while the tube 1 acts as a distortionless amplifier in so far as the high frequency voltage is concerned. The tube 1 includes also a suppressor grid 48 connected to the cathode, a screen grid 50 connected through a resistor 52 to a suitable source of positive anode potential and an anode 54 connected to the source of potential through a resonant circuit 56 and a resistor 58. The resistors 52 and 58 are shunted by by-pass condensers 60 and 62, respectively.

The resonant circuit 56 in the anode circuit of the tube 1 is made to resonate at the frequency of the high frequency control voltage. It includes an inductance 64 and a resistor 66, the capacitance necessary to resonate the circuit being supplied by the capacity inherent in the circuit.

Tube 1 is coupled to the control grid 68 of tube 2 through a circuit including the coupling capacitor 70, a resistor 72 connecting the capacitor to the grid and a resistor 74 connecting the junction of the capacitor 70 and resistor 72 to ground. The cathode 76 of the tube is connected to ground through a self-biasing resistor 78 providing a small fixed bias potential E—78, the resistor being shunted by the by-pass capacitor 80. The suppressor grid 82 of the tube is connected to the cathode, the screen grid 84 is connected to a suitable source of positive anode potential through resistor 86 and the anode 88 is connected to the potential source through a resonant circuit 90 and a resistor 92. Resistors 86 and 92 are shunted by by-pass condensers 94 and 96.

The resonant circuit 90 is preferably made to be resonant at a frequency equal to twice the desired length of the pulse time. It includes an inductance 98 and a resistor 100, the circuit being tuned by the capacity inherent in the circuit.

The modulator 14 is coupled to the output circuit of tube 2 by a conductor 102.

The operation of the pulse generator will now be described in conjunction with Figs. 2 to 6, inclusive, which illustrate the control voltages supplied to the pulse generator, the pulses supplied by the generator to the modulator, and the wave shapes of the voltages and pulses and of the modified voltages at intermediate points of the pulse generator.

Figures 2, 2A, 3, 3A, 4, 4A, 5, 5A, 6, 6A:
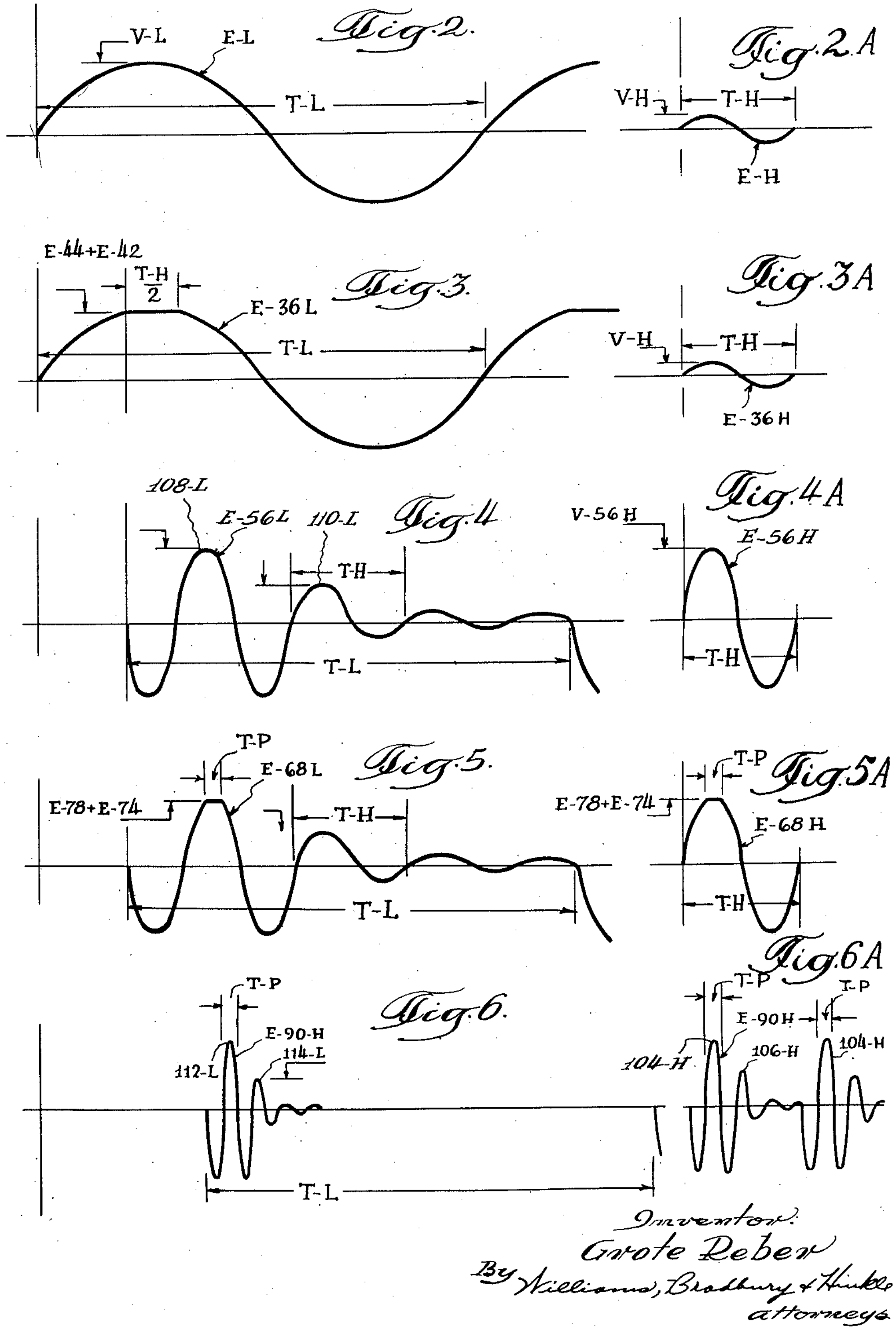

The dual oscillator, as heretofore indicated, alternately or selectively provides sinusoidal control voltages of different frequencies. The two control voltages are illustrated in Fig. 2 wherein the low frequency voltage is indicated by the reference character E—L in Fig. 2 and the high frequency voltage by the reference character E—H in Fig. 2A. The amplitude of the low frequency voltage E—L is considerably greater than the amplitude of the high frequency voltage E—H because, as already indicated, the amplitude of the latter is reduced by the load resistor 26 in resonant circuit 18. The amplitudes of the low and high frequency voltages appearing across the compound tuned circuit are indicated in Figs. 2 and 2A by the reference characters V—L and V—H. The periods of the two control voltages are indicated by reference characters T—L and T—H, respectively.

The voltages applied to the control grid 36 of tube 1 are depicted in Figs. 3 and 3A, in which the low and high frequency voltages are indicated by the reference character E—36L and E—36H. The high frequency control voltage is substantially unchanged because, as heretofore indicated, it has a peak value less than the fixed bias voltage E—44 obtained from across resistor 44.

The positive peaks of the low frequency voltage E—36L are, however, clipped off for time intervals equal to one-half the period of the high frequency voltage wave as indicated by the reference character $$\frac{T\text{—}H}{2}$$

thereby to induce oscillations at the high frequency in the resonant circuit 56. The clipping of the positive peaks means that the control grid 36 is driven positive with the result that grid current flows and the grid is biased not only by the voltage E—44 across the fixed bias resistor but also by a voltage drop across the resistor 42, which has a value E—42. As a consequence, the positive peaks of the low frequency voltage are limited to a value of E—44 plus E—42, as indicated in Fig. 3.

From this point on, the operation with the two control voltages will be considered separately and consideration will first be given to the operation with the high frequency voltage. As already indicated, the voltage applied to the grid 36 of tube 1 is substantially the duplicate of the voltage across the compound tuned circuit. The tube amplifies the high frequency voltage supplied to its grid without distortion, thereby producing an amplified high frequency voltage indicated by the reference character E—56H across the resonant circuit 56 in the plate circuit of tube 1. The amplitude of the voltage is indicated by the reference character V—56H.

The positive peaks of the amplified high frequency voltage are clipped when the voltage is applied to the grid 68 of tube 2, as indicated by the curve E—68H in Fig. 5A, thereby to induce oscillations having a frequency twice that of the pulse time in the resonant circuit 90. The clipping results from the fact that only a relatively small bias voltage E—78 is supplied by the drop across resistor 78 so that the grid 68 is driven positive. Some grid current flows with the result that there is a voltage drop across the resistor 74 so that some additional bias is built up as a result of this voltage drop, which may be indicated by the reference character E—74. Accordingly, for the clipping to obtain it is necessary that the amplitude of the high frequency voltage V—56H be greater than the sum of the voltage drops across resistors 78 and 74. Thus, the high frequency positive peaks are limited to an amplitude of E—78 plus E—74 as indicated in Fig. 5A.

The clipping action flattens the top of the high frequency voltage applied to the grid 68 for a time which is chosen to be the pulse time and indicated by the reference character T—P, which time may be adjusted by varying the value of the resistance of resistor 72.

The flattening of the high frequency voltage wave applied to the control grid of tube 2 results in the setting up of two voltage waves in the anode circuit of the tube, which circuit, it may be remembered, has a resonant circuit 90 resonated to a period of twice the pulse time. The first of the waves has an initial downward swing at the instant the curve E—68H of Fig. 5A flattens off. The second wave has an initial upward swing at the instant the wave E—68H begins to fall off. By making the flattened portion of wave E—68H equal to the duration T—P of the pulse, the two waves are made to aid each other and to give a damped output wave indicated by reference character E—90H in Fig 6A across the turned output circuit of the amplifier 2, which wave is supplied through the modulator 14 to conductor 102.

The useful portion of the damped output wave is the first positive peak indicated by the reference character 104—H, having a duration equal to the pulse time T—P. It performs the useful work by driving the modulator The second positive peak, indicated by reference character 106—H serves no useful purpose and its amplitude should be kept equal to a half or less of the amplitude of the first positive peak. The ratio of the two peaks can be adjusted by varying the value of resistor 100 in the resonant circuit 100.

Reviewing the operation of the apparatus when the high frequency control voltage is supplied to it, it will be noted that a useful positive pulse having a duration of T—P occurs at a frequency corresponding to the frequency of the input voltage.

Referring now to the operation when the low frequency voltage is applied to the apparatus, it has been already described that the control voltage appearing across the compound tuned circuit 16 is indicated in Fig. 2 and that this voltage with the positive peaks clipped off is applied to the grid 36 of tube 1 as indicated in Fig. 3.

The application of the low frequency voltage wave E—36L to the control grid of tube 1 produces, in a manner heretofore described in connection with tube 2, a damped wave E—56L in the output circuit of tube 1, which includes the resonant circuit 56. The frequency of the damped wave is equal to the high frequency and is determined by the resonance frequency of the tuned circuit 56, which, it may be remembered is tuned to the high frequency. The damped wave has a first positive peak indicated by reference character 108—L and a second positive peak 110—L, the ratios of which may be adjusted by variation of the resistor 66 of the resonant circuit. The adjustment must be such that the amplitude of the first peak is substantially greater than the total bias supplied to the grid of the second tube, i. e., greater than E—78 plus E—74 so that the peak of the first positive peak 108—L will be clipped and limited to this value as indicated by the reference character E—68L in Fig. 5. The adjustment is also such that the amplitude of the second positive peak 110—L is less than the limiting bias E—78 plus E—74 of tube T—2 so that it will not be clipped off. Consequently, the damped wave E—68L illustrated in Fig. 5 and applied to the grid 68 of tube 2 has the same form as illustrated in Fig. 4 except that the peak is clipped to the limiting value, again for a time equal to the pulse time T—P. The application of the limited low frequency control voltage to the grid of tube 2 produces a damped output wave indicated by reference character E—90H in Fig. 6 which is applied to the modulator. The first positive peak 112—L is the useful one and it should have an amplitude at least twice that of the second positive peak 114—L.

When the low frequency control voltage is supplied to the pulse generator, a useful pulse having a period of T—P is produced at the frequency of the low frequency control voltage.

It is, of course, desirable from the standpoint of uniformity that the amplitudes of the useful pulses 104—H and 112—L be the same. This is accomplished by making equal the amplitudes of the voltages E—68H and E—68L applied to the grid of tube 2.

Among the advantages of the present invention are that pulses of equal amplitude and equal duration are obtainable with widely different input frequencies and without any mechanical or electrical switching of components or circuits. Consequently, the system is simple, compact and rugged. It lends itself to quite short switching time from one frequency to the other, being limited only to a switching time greater than the period of the low frequency. The apparatus is also independent of the switching time, which may be variable.

While the present invention has been illustrated in connection with the details of a single embodiment, it should be understood that such details are not limitative of the invention. For instance, the high frequency has been indicated as having a period eight times that of the pulse time and the low frequency having a period equal to four times that of the pulse, but other combinations may be used. Also more than two repetition rates, i. e., the high and low frequencies, may be had by using more tubes and tuning the successive circuits to higher frequencies and arranging the voltages and biases in the manner described above.

Having thus described my invention, what I claim as new and desire to secure by Letters Patent is:

1. A pulse generator, including in combination, an amplifier tube having an input grid, means for biasing said grid, a resonant circuit connected to the output of said tube, and means including a compound tuned circuit coupled to the grid and having a loading resistor associated with one of the tuned circuits of the compound tuned circuit for supplying said grid with alternating current voltages having positive peak values below and in excess of the bias applied to said grid.

2. A pulse generator, including in combination, means for selectively supplying a plurality of alternating current control voltages of different frequencies of which a higher frequency has a peak value less than that of a lower, means coupled to said means and supplied with said voltages for amplifying the higher frequency voltage in non-distorted manner and for producing damped waves of the higher frequency, and means coupled to said last mentioned means and supplied with said amplified voltage and damped waves for producing damped waves having a frequency that is a multiple of the higher of said frequencies.

3. A pulse generator, including in combination, means for selectively supplying a plurality of alternating current control voltages of different frequencies of which a higher frequency has a peak value less than that of the lower, means coupled to said means and supplied with said voltages for amplifying the higher frequency voltage in non-distorted manner and for producing damped waves of the higher frequency having a first positive peak substantially greater than the second, and means coupled to said last mentioned means and supplied with said amplified voltage and damped waves for producing damped waves having a frequency that is a multiple of the higher of said frequencies and a first positive peak substantially greater than the second.

4. A pulse generator, including in combination, means for selectively supplying a plurality of alternating current control voltages of different frequencies of which the higher has a peak value less than that of the lower, means including an electron tube and a resonant circuit coupled to said means and supplied with said voltages for amplifying the higher frequency voltage in non-distorted manner and for producing damped waves of the higher frequency, and means including an electron tube and a resonant circuit coupled to said last mentioned means and supplied with said amplified voltage and damped waves for producing damped waves having a frequency that is a multiple of the higher of said frequencies.

5. A pulse generator, including in combination, means for selectively supplying two alternating current control voltages of different frequencies, a compound tuned circuit coupled to said means having resonant circuits tuned to said frequencies, means associated with the circuit tuned to the higher of said frequencies for reducing the positive peak values of the higher frequency control voltage, an electron tube having a control grid, a circuit coupling said grid to said compound circuit, means including a self bias resistor and a resistor in the coupling circuit for biasing said grid so that the higher frequency voltage is amplified in a substantially distortionless manner and the positive peaks of the lower frequency voltage are clipped off, a resonant circuit tuned to said higher frequency coupled to the output of said tube, a second tube having a control grid, a coupling circuit coupling said grid to said resonant circuit, means including a self bias resistor and a resistor in the coupling circuit for biasing said grid to a value such that the positive peaks of the amplified higher frequency voltage and of the first positive peak of oscillations induced by the lower frequency control voltage in said resonant circuit are clipped off, and a resonant circuit tuned to a multiple of the frequency of the higher frequency coupled to the output circuit of the second tube.

6. A pulse generator, including in combination, means for selectively supplying two alternating current control voltages of different frequencies, a compound tuned circuit coupled to said means having resonant circuits tuned to said frequencies, means associated with the circuit tuned to the higher of said frequencies for reducing the positive peak values of the higher frequency control voltage, an electron tube having a control grid, a circuit coupling said grid to said compound circuit, means including a self bias resistor and a resistor in the coupling circuit for biasing said grid so that the higher frequency voltage is amplified in a substantially distortionless manner and the positive peaks of the lower frequency voltage are clipped off, a resonant circuit tuned to said higher frequency coupled to the output of said tube, a second tube having a control grid, a circuit coupling said grid to said resonant circuit, means including a self bias resistor and a resistor in the coupling circuit for biasing said grid to a value such that the positive peaks of the amplified higher frequency voltage and of the first positive peaks of oscillations induced by the lower frequency control voltage in said resonant circuit are clipped off, and a resonant circuit tuned to four times the frequency of the higher frequency coupled to the output circuit of the second tube.

7. A pulse generator, including in combination, means for supplying two alternating current control voltages of different frequencies, a compound tuned circuit coupled to said means having resonant circuits tuned to said frequencies, means including an electron tube coupled to said tuned circuit, biasing means associated with the tube and a resonant circuit tuned to said higher frequency coupled to the output of said tube for producing voltage waves of the higher frequency, and means including a second electron tube, biasing means associated with said tube and a resonant circuit tuned to four times the frequency of the higher frequency coupled to the output circuit of the second tube for producing a pulse.

GROTE REBER.

REFERENCES CITED

The following references are of record in the file of this patent:

UNITED STATES PATENTS

| Number | Name | Date |
|---|---|---|
| 2,103,090 | Plebanski | Dec. 21, 1937 |
| 2,153,202 | Nichols | Apr. 4, 1939 |
| 2,237,661 | Ernst | Apr. 8, 1941 |
| 2,266,668 | Tubbs | Dec. 16, 1941 |
| 2,286,378 | Roberts | June 16, 1942 |
| 2,364,756 | Roberts | Dec. 12, 1944 |
| 2,403,624 | Wolff | July 9, 1946 |
| 2,431,324 | Grieg | Nov. 25, 1947 |

FOREIGN PATENTS

| Number | Country | Date |
|---|---|---|
| 92,797 | Sweden | Sept. 23, 1939 |

OTHER REFERENCES

QST, August 1940, page 36.